(12) United States Patent  
Choi et al.

(10) Patent No.: US 8,000,119 B2
(45) Date of Patent: Aug. 16, 2011

(54) SWITCHING MODE POWER SUPPLY AND METHOD OF OPERATION

(75) Inventors: Hang-Seok Choi, Bucheon (KR); Gwan-Bon Koo, Bucheon (KR); Jae-Hwoan Chi, Bucheon (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 689 days.

(21) Appl. No.: 11/879,550

(22) Filed: Jul. 18, 2007

(65) Prior Publication Data

US 2008/0049457 A1  Feb. 28, 2008

(30) Foreign Application Priority Data

Jul. 19, 2006  (KR) .................. 10-2006-0067436

(51) Int. Cl.
*H02M 7/537* (2006.01)
(52) U.S. Cl. .......................................... 363/131; 363/97
(58) Field of Classification Search .................. 363/16, 363/20, 21.01–21.04, 95, 97, 131
See application file for complete search history.

(56) References Cited

U.S. PATENT DOCUMENTS

| | | | |
|---|---|---|---|
| 6,249,876 B1 | 6/2001 | Balakrishnan et al. | |
| 6,341,073 B1 * | 1/2002 | Lee | 363/21.02 |
| 6,587,361 B2 * | 7/2003 | Preller | 363/97 |
| 6,646,894 B2 * | 11/2003 | Hong et al. | 363/21.01 |
| 7,208,985 B2 * | 4/2007 | Yamashita | 327/108 |
| 7,382,633 B2 * | 6/2008 | Aso et al. | 363/21.04 |
| 7,466,569 B2 * | 12/2008 | Yang et al. | 363/21.03 |
| 2004/0057256 A1 * | 3/2004 | Feldtkeller | 363/21.01 |
| 2004/0120171 A1 * | 6/2004 | Choi et al. | 363/97 |
| 2005/0281062 A1 * | 12/2005 | Choi et al. | 363/21.08 |
| 2006/0028847 A1 * | 2/2006 | Ryu et al. | 363/21.01 |
| 2007/0216372 A1 * | 9/2007 | Weng et al. | 323/222 |

* cited by examiner

*Primary Examiner* — Adolf Berhane
*Assistant Examiner* — Emily Pham
(74) *Attorney, Agent, or Firm* — Sidley Austin LLP

(57) ABSTRACT

In one embodiment, an SMPS includes a rectifier for generating an input DC voltage from an input AC voltage. A switching transistor is coupled to a primary coil of a transformer for generating power which is transferred to a second side of the transformer according to an operation of the switching transistor. A switching controller receives a feedback voltage corresponding to an output voltage, a sensing signal corresponding to a current flowing through the switching transistor, and a first signal corresponding to a voltage difference between a first electrode and a second electrode of the switching transistor. The switching controller controls an on/off operation of the switching transistor. The switching controller sets a threshold period whenever the first signal has a value greater than a reference value, thereby setting a plurality of threshold periods during operation of the switching mode power supply. For each threshold period, the switching controller turns on the switching transistor at a point after a variable delay time from a previous point at which the switching transistor was turned on.

50 Claims, 6 Drawing Sheets

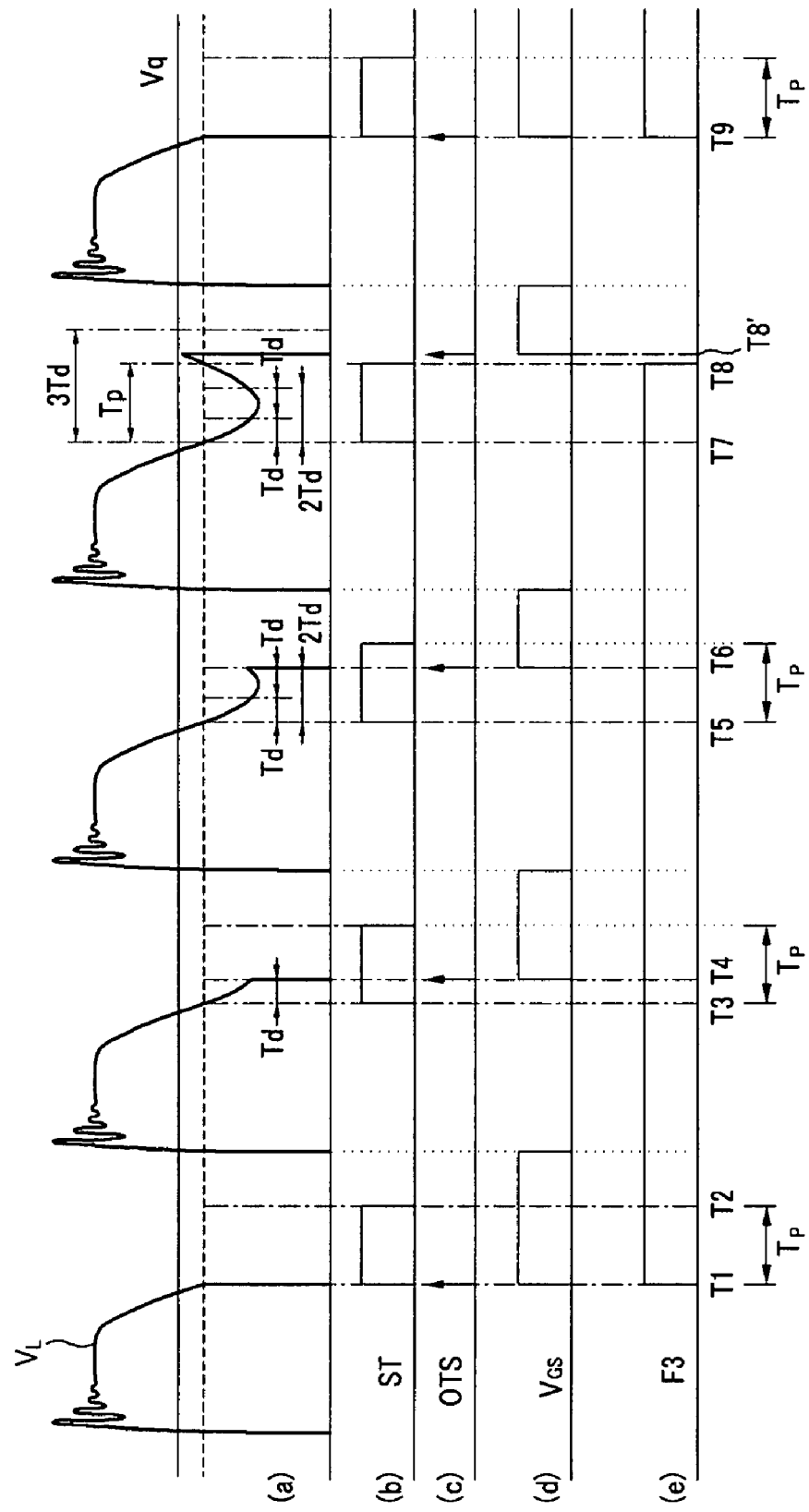

SWITCHING MODE POWER SUPPLY AND METHOD OF OPERATION

CROSS-REFERENCE TO RELATED APPLICATION

This application claims priority to and the benefit of Korean Patent Application No. 10-2006-0067436 filed in the Korean Intellectual Property Office on Jul. 19, 2006, the entire content of which is incorporated herein by reference.

BACKGROUND OF THE INVENTION (a) Field of the Invention

The present invention relates to a switching mode power supply (SMPS) and, more particularly, to a quasi-resonant SMPS and a method of operation.

(b) Description of the Related Art

In general, a SMPS has at least one switching device (e.g., a transistor) which can be switched or turned on an off to deliver or supply power to a load. A SMPS can rectify an input AC voltage to an input DC voltage (also called a DC-link voltage) and convert the input DC voltage into an output DC voltage having a different level. An SMPS can be used in electronic devices such as mobile phone chargers or laptop computer adapters.

Electromagnetic interference (EMI) can arise in a SMPS, in part, due to turning on and off a switching device at constant frequency. A device with high EMI generates noise in other devices using the same power source. Various regulations exist for EMI, such as, for example, limiting the average value of measured EMI during constant time in the constant frequency range, or limiting the average value of measured EMI in the constant frequency range.

A quasi-resonant SMPS is one in which the switching frequency for turning on and off the switching device is modulated within a range in order to reduce EMI. The EMI spectrum for a conventional quasi-resonant SMPS is scattered with the changing switching frequency, responsive to a ripple of the DC-link voltage. This minimizes a power supply's switching losses, while allowing for higher switching frequencies. As the AC input voltage increases in a conventional quasi-resonant SMPS, the DC-link voltage ripple of the SMPS decreases. The decrease in the DC-link voltage ripple may reduce the modulation range of the switching frequency, thus resulting in an increase in EMI.

SUMMARY OF THE INVENTION

Various embodiments of the present invention provide a switching mode power supply and a driving method thereof which reduce EMI by changing a switching frequency of a switching device (e.g., transistor), regardless of an input AC voltage.

In one aspect of the present invention, an SMPS includes a rectifier for generating an input DC voltage from an input AC voltage. A switching transistor is coupled to a primary coil of a transformer for generating power which is transferred to a second side of the transformer according to an operation of the switching transistor. A switching controller receives a feedback voltage corresponding to an output voltage, a sensing signal corresponding to a current flowing through the switching transistor, and a first signal corresponding to a voltage difference between a first electrode and a second electrode of the switching transistor. The switching controller controls an on/off operation of the switching transistor. The switching controller sets a threshold period whenever the first signal has a value greater than a reference value, thereby setting a plurality of threshold periods during operation of the switching mode power supply. For each threshold period, the switching controller turns on the switching transistor at a point after a variable delay time from a previous point at which the switching transistor was turned on. The variable delay time may include a first delay time and a second delay time having same or different values.

The switching controller may turn on the switching transistor at a point corresponding to an ending point of the threshold period if the variable delay time is longer than the threshold period. The switching controller may perform an operation for turning on the switching transistor at least once at a point delayed by the first delay time from the start point of the threshold period and then performs an operation for turning on the switching transistor at a point delayed by the second delay time from the first delayed time. The switching controller may determine the threshold period by comparing a current value of a current signal determined by a difference between a voltage of the first signal and a sensing reference voltage and the reference current value. The switching controller may include a threshold period sensor for generating a sensing signal having a pulse of the first level by corresponding to the threshold period; a period determining unit for determining whether the accumulated delay time is over the threshold period; an on-time controller for generating an on-time control signal for turning on the switching transistor at a point delayed by the variable delay time from the start point of the threshold period or previous delayed point; and a gate driver for generating a gate control signal that turns on the switching transistor according to the on-time control signal.

The period determining unit may include a first logical operation unit that receives the gate control signal and the sensing signal to a first stage and a second stage, respectively, that outputs, if a signal input to the second stage is in a first level, a signal of the second level, and that sustains, if both of the gate control signal and the sensing signal are in a third level, a first logical operation signal output to a immediately prior state; a second logical operation unit that receives an inversion signal of the sensing signal and the first logical operation signal to generate a second logical operation signal by an AND operation of the signals; and a third logical operation unit that receives the sensing signal and the second logical operation signal to a third stage and a fourth stage, respectively to generate, if the second logical operation signal is in a fourth level, a third logical operation signal of a fifth level.

Another embodiment of the present invention provides a switching mode power supply. The switching mode power supply includes a rectifier for generating an input DC voltage from an input AC voltage. A switching transistor is coupled to a primary coil of a transformer for generating power to a second side of the transformer according to an operation of the switching transistor. A switching controller receives a feedback voltage corresponding to an output voltage of the switching mode power supply, a sensing signal corresponding to a current flowing to the switching transistor, and a first signal corresponding to a voltage difference between the first electrode and the second electrode of the switching transistor. The switching controller controls the turning on and off the switching transistor. The switching controller sets a threshold period whenever the first signal has a value greater than a reference value, thereby setting a plurality threshold periods during operation of the switching mode power supply. For each threshold period the switching controller turns on the switching transistor after a lapse of a variable delay time from a start of the threshold period.

Yet another embodiment of the present invention provides a method for driving a switching mode power supply that generates an input DC voltage by rectifying an input AC voltage, and generates an output DC voltage by converting the input DC voltage according to the turning on and off of a switching transistor. The method includes: generating a first signal corresponding to a voltage between the first electrode and the second electrode of the switching transistor after the switching transistor is turned off; sensing a threshold period using a current signal corresponding to the first signal; turning on the switching transistor at a point after a variable delay from a previous point at which the switching transistor was turned on; and changing the variable delay period. The switching transistor may be turned on at a point corresponding to an ending point of the threshold period if the accumulated delay time is over the threshold period.

Yet another embodiment of the present invention provides a driving method of a switching mode power supply that generates an input DC voltage by rectifying an input AC voltage, and generates an output DC voltage by converting the input DC voltage according to turning on/off of a switching transistor, including: a) generating a first signal corresponding to a voltage difference between the first electrode and the second electrode of the switching transistor after the switching transistor is turned off; b) setting to a period in which a voltage of the first signal is higher than a reference voltage to a threshold period and turning on the switching transistor at a point corresponding to a same or variable delay period from a point of the threshold period; and c) changing the variable delay period. In the step b), the switching transistor may be turned on at a point corresponding to an ending point of the threshold period if the accumulated delay time is over the threshold period.

Important technical advantages of the present invention are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings.

FIG. 6 is a waveform diagram illustrating an exemplary driving method, according to an embodiment of the present invention.

DETAILED DESCRIPTION OF THE EMBODIMENTS

Figure 1:
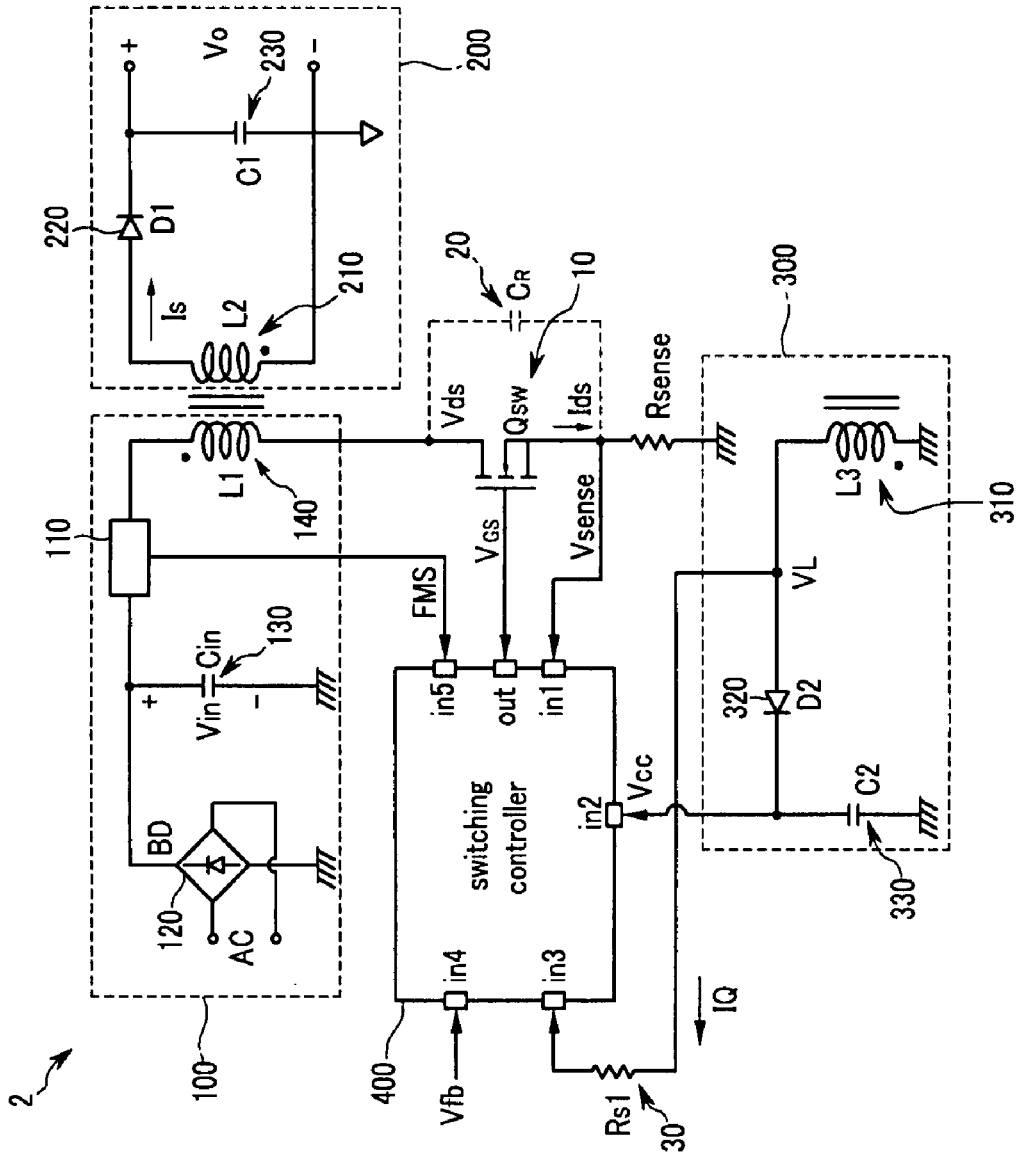
FIG. 1 is a schematic diagram of an exemplary implementation for an SMPS, according to an embodiment of the present invention.

Embodiments of the present invention and their advantages are best understood by referring to FIGS. 1 through 6 of the drawings. In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" or "connected" to another element, the element may be directly coupled or connected to the other element or electrically coupled or connected to the other element through one or more other elements. In addition, unless explicitly described to the contrary, the word "comprise" and variations such as "comprises" or "comprising," will be understood to imply the inclusion of stated elements but not the exclusion of any other elements.

According to some embodiments of the invention, a quasi-resonant SMPS and a driving method thereof maintains a consistent frequency modulation range for a switching device (e.g., transistor) of the SMPS regardless of the level of an input AC voltage, thereby reducing EMI and maintaining switch efficiency.

FIG. 1 is a schematic diagram of an exemplary implementation for an SMPS 2, according to an embodiment of the present invention. As shown in FIG. 1, the SMPS 2 includes a power supply block 100, an output block 200, a bias voltage supply block 300, and a switching controller block 400.

The power supply block 100 can include a bridge diode (BD) 120 for rectifying an AC input voltage ACin, a capacitor (Cin) 130 for smoothing a rectified voltage, and a primary coil (L1) 140 of a transformer coupled to the capacitor 130. The power supply block 100 converts ACin to a DC voltage Vin by the bridge diode 120 and the capacitor 130, and supplies power to a secondary side of the transformer, output block 200, according to a duty cycle of a switching transistor (Qsw) 10.

The power supply block 100 can also include a modulation determining block 110 for determining whether to perform switching frequency modulation in the switching controller block 400. If the DC voltage Vin is less than or equal to a modulation reference voltage, enough ripple has been generated and the modulation determining block 110 determines that a switching frequency modulation is not necessary in the switching controller block 400. Accordingly, modulation determining block 110 provides a frequency modulation control signal FMS to an input terminal IN5 of the switching controller block 400 to halt or not cause frequency modulation in the switching of transistor 10. Alternatively, if the DC voltage Vin is greater than the modulation reference voltage, modulation determining block 110 determines that a switching frequency modulation is necessary in the switching controller block 400. The modulation determining block 110 provides a value of the frequency modulation control signal FMS which causes the switching controller block 400 to perform switching frequency modulation, thus reducing EMI. According to an embodiment of the present invention, the modulation reference voltage can be set to a voltage corresponding to the highest input DC voltage when the EMI generated by input AC voltage ripple meets the EMI regulation.

The output block 200 can include a secondary coil (L2) 210 of the transformer, a diode (D1) 220 whose anode is coupled to the secondary coil 210 of the transformer, and a capacitor (C1) 230 coupled between a cathode of the diode 220 and ground. Current Is flows from secondary coil 210 through the diode 220 to charge the capacitor 230 at an output terminal of the output block 200. An output voltage Vo is provided to a load at an output terminal.

The bias voltage supply block 300 can include a secondary coil (L3) 310 of the transformer, a diode (D2) 320 whose anode is coupled to the secondary coil 310, and a capacitor (C2) 330 coupled between a cathode of the diode 330 and ground. The switching controller block 400 can be implemented as an Integrated Circuit (IC), and the bias voltage supply block 300 can supply or provide a bias voltage Vcc for operating the IC. That is, when the switching transistor 10 begins switching, the secondary coil 310 and the diode 320 also begin operation, thus charging capacitor 330 to provide Vcc.

A voltage signal VL is generated at one end of secondary coil 310 in bias voltage supply block 300. Voltage signal VL corresponds to, is indicative of, or otherwise reflects, a drain-source voltage (Vds) of the switching transistor 10. A sensing resistor (Rs1) 30 is coupled between the anode of diode 320 (the node for voltage signal VL) and an input terminal IN3 of the switching controller block 400. In one embodiment, the value of the sensing resistor 30 affects a threshold period TP (described in more detail herein). Thus, varying the value of the sensing resistor 30 adjusts the threshold period TP. A current signal IQ flows through the sensing resistor 30 due to a difference between the voltage VL and the voltage at input terminal IN3 of the switching controller block 400. Although current signal IQ is shown as being generated in bias voltage supply block 300, in other embodiments, other circuitry or elements can be used to generate and provide the current signal IQ to switching controller block 400.

Switching controller block 400 outputs a gate control signal VGS for controlling the turning on and off of the switching transistor 10. The switching controller block 400 receives the frequency modulation control signal FMS from modulation determining block 110, a feedback signal Vfb, a signal Vsense which is an indication of current Ids flowing through the switching transistor 10, and the voltage signal VL. The switching controller block 400 is responsive to the modulation control signal FMS. When the modulation control signal FMS instructs switching controller block 400 to halt or not cause frequency modulation, then switching controller block 400 may operate the switching transistor 10 at a fixed frequency. Then, if a drain-source voltage (Vds) of the switching transistor 10 is only the valley (lowest value), switching controller block 400 turns on switching transistor 10. Alternately, when the modulation control signal FMS instructs switching controller block 400 to modulate the switching frequency for switching transistor 10, then switching controller block 400 will modulate the frequency at which switching transistor 10 is switched. For modulated switching frequency operation, switching controller block 400 turns on switching transistor 10 if a drain-source voltage (Vds) of the switching transistor 10 is close to or around the valley. The feedback signal Vfb is a signal corresponding to the output voltage Vo, and may be used in determining the turn-off of the switching transistor 10. The feedback signal Vfb can be generated by a photo-coupled photodiode and a transistor, as understood by those skilled in the art.

The switching controller block 400 can sense or set a threshold period TP. The threshold period TP may be defined by or include a valley in a resonant waveform generated when the Vds of switching transistor 10 resonates, as described in more detail with reference to FIG. 2.

According to one embodiment of the present invention, the switching controller block 400 can set a threshold period TP using or in response to a current IQ. Current IQ flows through sensing resistor 30 due to the voltage difference between the input terminal IN3 (of switching controller block 400) and the voltage VL. When the current signal IQ is generated, the input terminal IN3 of the switching controller block 400 is maintained at a fixed voltage. Switching controller block 400 may compare the current signal IQ against a reference current value. The switching controller block 400 sets the threshold period TP to be a period when the current signal IQ is greater than or equal to the reference current value. The reference current value can be adjustable (variable) or fixed. In embodiments where the reference current value is variable, the value of the reference current can be varied either internally within or external to the switching controller block 400. In one embodiment, the switching controller block 400 may count the number of times the switching transistor 10 is turned on. Switching controller block 400 can change the reference current value if the number of times the switching transistor 10 is turned on reaches a certain value, which may be predetermined. The predetermined value can be changed, for example, using a random variable generator.

According to another embodiment of the present invention, the switching controller block 400 can set a threshold period TP using or in response to a voltage signal VQ. An exemplary implementation for such embodiment is shown and described with reference to FIGS. 3 and 4. In such embodiment, the switching controller block 400 may compare the voltage signal VQ against a reference voltage, which can be adjustable or fixed.

The switching controller block 400 can change a reference current value or a reference voltage value after a predetermined time elapses. The predetermined time can be changed at random.

The switching controller 400 can adjust or vary a delay time for turning on the switching transistor 10 during the threshold period TP. For each threshold period TP, the switching controller block 400 may turn-on the switching transistor 10 after some amount of delay time (which can vary) during (or even after) the threshold period TP. This is described in more detail with reference to FIG. 6.

All or a portion of SMPS 2 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals therebetween. In one embodiment, for example, switching controller block 400 and switching transistor 10 are implemented in the same or separate chip or die, and the remaining elements of SMPS 2 are implemented as discrete components. In one embodiment, switching controller block 400 can be provided in one semiconductor package, while switching transistor 10 can be provided in another semiconductor package. In another embodiment, switching controller block 400 and switching transistor 10 are provide in the same semiconductor package.

Figure 2:
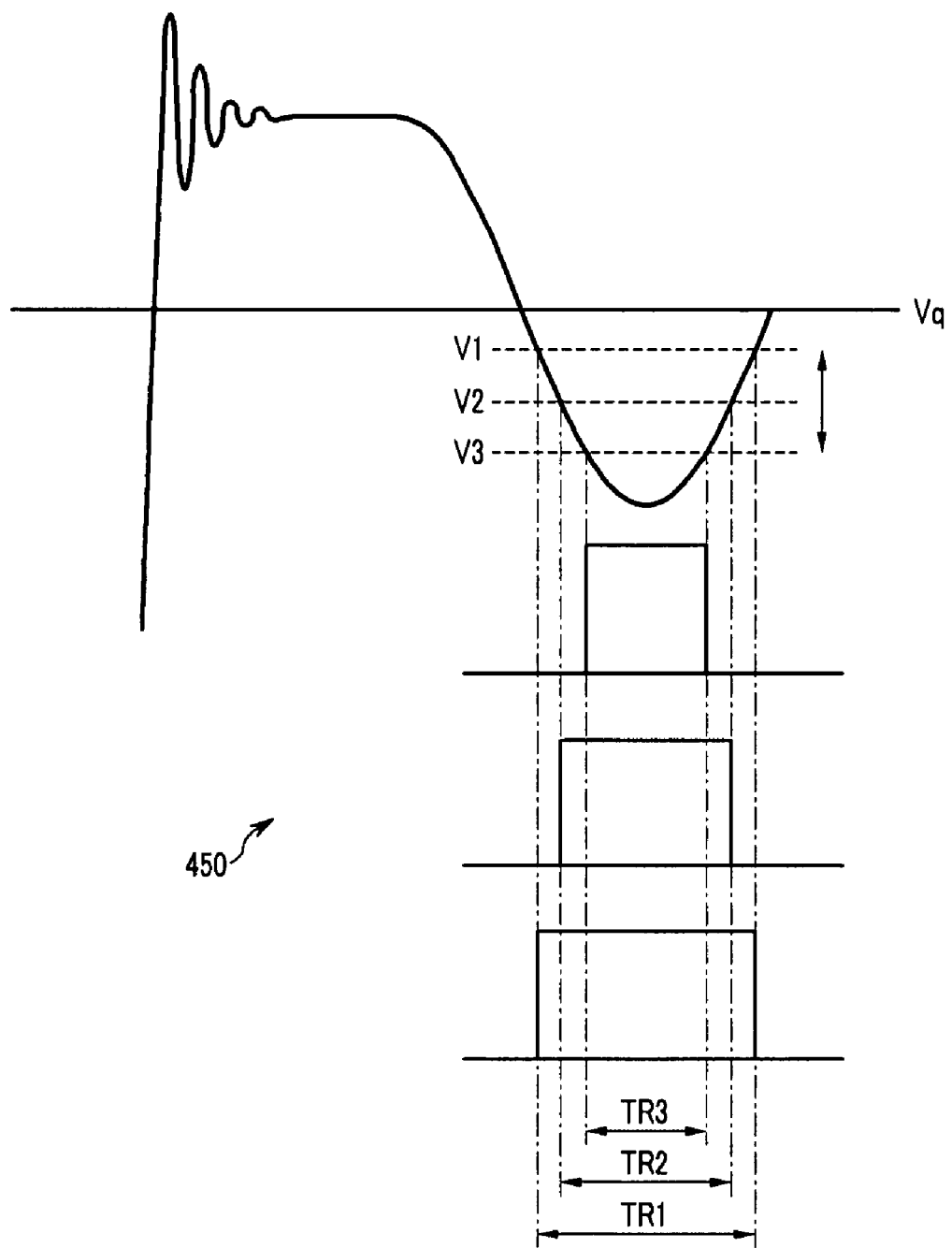
FIG. 2 is a waveform diagram illustrating an exemplary operation for an SMPS, according to an embodiment of the present invention.

FIG. 2 is a waveform diagram 450 illustrating an exemplary operation for an SMPS, according to an embodiment of the present invention. Such SMPS can be that shown and described with reference to FIG. 1. FIG. 2 depicts a resonant waveform of voltage signal VL of a secondary coil 310 in bias voltage generator 300. As discussed above, voltage signal VL corresponds to, is indicative of, or otherwise reflects, a drain-source voltage Vds of the switching transistor 10.

If a current Is does not flow in the output block 200 after the switching transistor 10 is turned off, resonance is generated between the primary coil 140 of the transformer and a resonance capacitor (CR) 20. The inductance value of the primary coil 140 and the capacitance value of the resonance capacitor 20 determine or establish a resonance cycle. When resonance is generated between the primary coil 140 of the transformer and the resonance capacitor 20, the value of drain-source voltage Vds of switching transistor 10 changes while forming a cosine curve based on a Vin voltage.

Voltage signal VL shown in FIG. 2 corresponds to a drain-source voltage Vds of the switching transistor 10. As Vds changes as described above, so does voltage signal VL. Thus, voltage signal VL changes while forming a cosine curve based on a resonance reference voltage Vq. The resonant waveform for voltage signal VL in FIG. 2 has a "valley" where the value of voltage signal VL falls or dips below the resonance reference voltage Vq.

The sensing resistor 30 generates and senses a current signal IQ, which can be used to set or determine the threshold period TP. The switching controller block 400 may compare the current signal IQ against a reference current. In some embodiments, the value of the reference current can be adjusted or varied. As shown in FIG. 2, the switching controller block 400 sets the threshold period TP to be the period TR1 defined as the time when the current signal IQ is greater than or equal to a first reference current value (marked by the voltage signal VL crossing a voltage V1). The switching controller block 400 sets the threshold period TP to be the period TR2 defined as the time when the current signal IQ is greater than or equal to a second reference current value (marked by the voltage signal VL crossing a voltage V2). The switching controller block 400 sets the threshold period TP to be the period TR3 defined as the time when current signal IQ if greater than or equal to a third reference current value (marked the voltage signal VL crossing a voltage V3).

Thus, as shown and described with reference to FIG. 2, the switching controller block 400 sets the threshold period TP using the current signal IQ, according to an embodiment of the present invention. However, the present invention is not so limited. In some embodiments, for example, when the switching controller 400 sets the threshold period TP using the current signal IQ, the value of the reference current can be fixed and the sensing resistor Rs1 can be changed.

Figure 3:
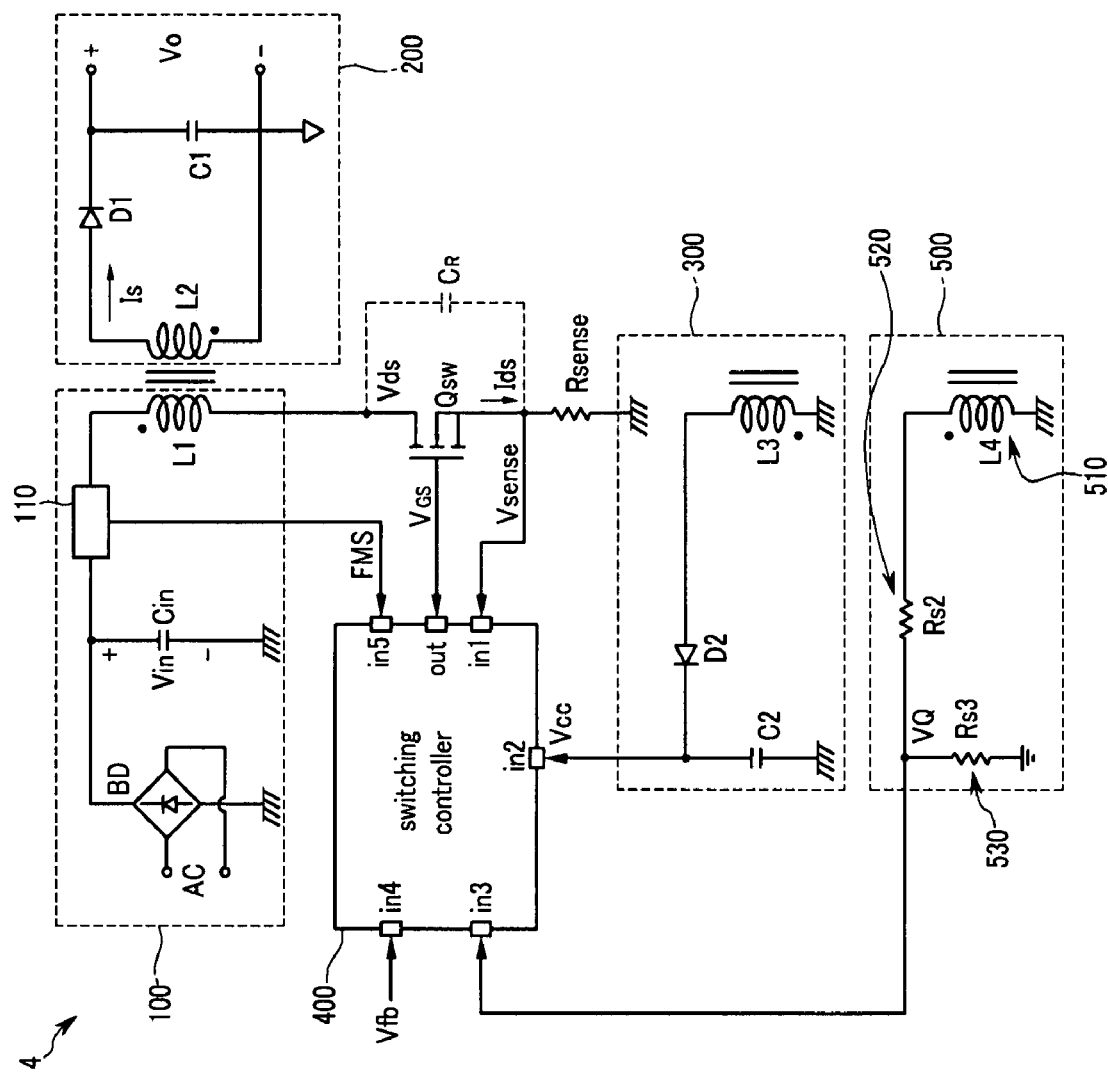
FIG. 3 is a schematic diagram of another exemplary implementation for an SMPS, according to an embodiment of the present invention.

FIG. 3 is a schematic diagram of an exemplary implementation for an SMPS 4, according to another embodiment of the present invention. In this embodiment, the SMPS 4 sets the threshold period TP using the voltage signal VQ.

SMPS 4 shown in FIG. 3 is similar to SMPS 2 shown in FIG. 2, and thus includes many of the same components. As depicted, SMPS 4 includes a power supply block 100, an output block 200, a bias voltage supply block 300, a switching controller block 400, and a signal generator block 500. The description of power supply block 100, output block 200, bias voltage supply block 300, and switching controller block 400 for the SMPS 2 of FIG. 1 is substantially applicable for the like-numbered components of SMPS 4 of FIG. 3. One exception, however, is that the SMPS 4 of FIG. 3 does not generate a current signal IQ in the bias voltage supply block 300.

SMPS 4 of FIG. 3 also has a signal generator block 500. The signal generator block 500 can include a secondary coil (L4) 510, a sensing resistor (Rs2) 520, and a sensing resistor (Rs3) 530. The signal generator block 500 generates a voltage signal VQ induced by the secondary coil 510 according to a resistance ratio (Rs3/(Rs2+Rs3)). Voltage signal VQ corresponds to, is indicative of, or otherwise reflects, a drain-source voltage (Vds) of the switching transistor 10. The signal generator block 500 provides the voltage signal VQ to the input terminal IN3 of the switching controller block 400. In this embodiment, the switching controller block 400 can adjust a threshold period TP according to a resistance ratio (Rs3/(Rs2+Rs3)).

The switching controller block 400 may compare the voltage signal VQ against a reference voltage Vref. The switching controller block 400 can set the threshold period TP to be a period when voltage signal VQ is greater than or equal to the reference voltage value Vref. The value of reference voltage Vref can be adjustable (variable) or fixed. In some embodiments, the switching controller block 400 counts the number of times the switching transistor 10 is turned on. If the number of times switching transistor 10 is turned on reaches a certain value (which can be predetermined), switching controller block 400 may change the value of reference voltage Vref. The predetermined value for the count can be changed, for example, using a random variable generator. The switching controller block 400 can also change a value reference voltage Vref after a predetermined time has elapsed. The predetermined time can also be changed at random.

Figure 4:
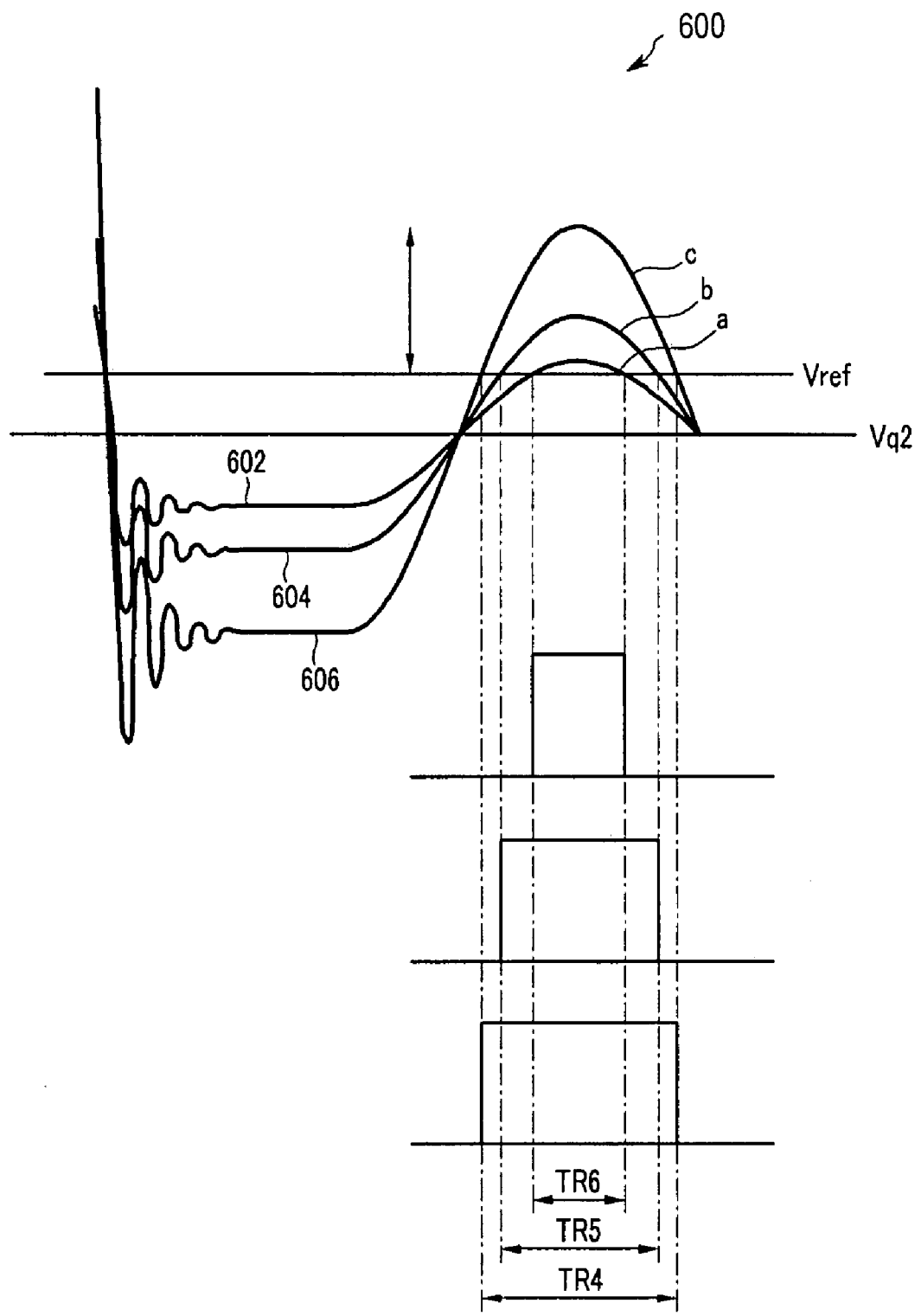
FIG. 4 is a diagram waveform illustrating an exemplary implementation for an SMPS, according to an embodiment of the present invention.

FIG. 4 is a waveform diagram 600 illustrating an exemplary implementation for an SMPS, according to an embodiment of the present invention. Such SMPS can be that shown and described with reference to FIG. 3. FIG. 4 depicts a waveform of a voltage signal VQ, which may be generated in secondary coil 510 and provided by signal generator block 500. As discussed above, voltage signal VQ corresponds to, is indicative of, or otherwise reflects, a drain-source voltage Vds of the switching transistor 10.

Waveform diagram 600 includes exemplary waveforms 602, 604, and 606, which represent the voltage signal VQ at different resistance ratios (for sensing resistor (Rs2) 520 and a sensing resistor (Rs3) 530). If the current Is does not flow in output block 200 after the switching transistor 10 is turned on, resonance is generated between the primary coil 140 of the transformer and the resonance capacitor 20. The inductance value of the primary coil 140 and the capacitance value of the resonance capacitor 20 determine or establish a resonance cycle. When resonance is generated between the primary coil 140 of the transformer and the resonance capacitor 20, the value of drain-source voltage Vds of switching transistor 10 changes while forming a cosine curve based on a Vin voltage.

Since voltage signal VQ corresponds to a drain-source voltage Vds of the switching transistor 10, the voltage signal VQ also changes while forming a sine curve based on a resonance reference voltage Vq2.

The voltage signal VQ reflects a signal of a drain-source voltage Vds of the switching transistor 10, but is a vertically inverted waveform. The resonant waveforms for voltage signal VQ in FIG. 4 each have an inverted "valley" where the value of voltage signal VQ rises above the resonance reference voltage Vq2.

As shown in FIG. 4, the voltage signal VQ has a divided voltage value induced by the secondary coil 510 according to the resistance ratio (Rs3/(Rs2+Rs3)). The switching controller 400 sets or determines a respective threshold period TP for each of waveforms 602, 604, and 606 (representing the voltage signal VQ at different resistance ratios for sensing resistors 520 and 530). As shown in FIG. 4, the switching controller block 400 sets the threshold period TP to be the periods TR4, TR5, and TR6 for waveforms 602, 604, and 606, respectively.

The switching controller 400 according to the this embodiment of the present invention sets the threshold period TP using the voltage signal VQ. However, the present invention is not so limited thereto. For example, the switching controller 400 can fix a resistance ratio and change a reference voltage value Vref when the threshold period TP is determined by the voltage signal VQ.

Figure 5:
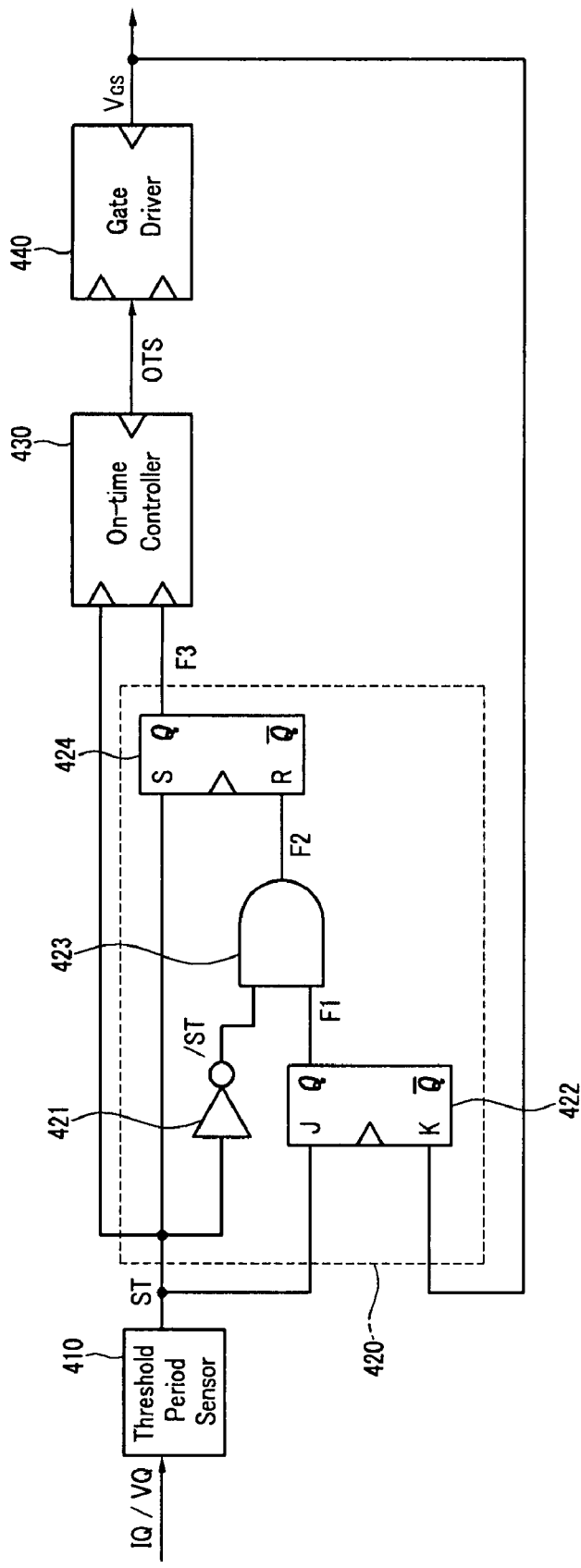
FIG. 5 is a schematic diagram of an exemplary implementation for a switching controller, according to an embodiment of the present invention.

FIG. 5 is a schematic diagram of an exemplary implementation for a switching controller block 400, according to an embodiment of the present invention. As shown in FIG. 5, the switching controller block 400 includes a threshold period sensor 410, a period determining block 420, an on-time controller 430, and a gate driver 440.

The threshold period sensor 410 detects each threshold period TP in the operation of the SMPS. To accomplish this, threshold period sensor 410 receives either a current signal IQ (in some embodiments) or voltage signal VQ (in other embodiments). Current signal IQ or voltage signal VQ corresponds to, is indicative of, or otherwise reflects, a drain-source voltage Vds of the switching transistor 10. In response to current signal IQ or voltage signal VQ, threshold period sensor 410 generates a sensing signal ST. The sensing signal ST comprises a high level pulse during each threshold period TP. The threshold period sensor 410 provides the sensing signal ST to the period determining block 420 and the on-time controller 430.

The period determining block 420 receives gate control signal VGS and sensing signal ST. For each threshold period TP, the period determining block 420 determines whether a variable delay time (for turning on the switching transistor 10) is longer than (extends beyond) such threshold period TP. The period determining block 420 can include an inverter 421, a JK flip-flop 422, an AND gate 423, and a SR flip-flop 424.

The inverter 421 receives the sensing signal ST and generates an inverted sensing signal (/ST). The inverter 421 provides the inverted sensing signal (/ST) to the AND gate 423. The JK flip-flop 422 receives the sensing signal ST and the gate control signal VGS at its J input and K input terminals, respectively, and performs a logical operation thereon. When the respective signals input to the J and K terminals are both high, the JK flip-flop 422 inverts a value of the first logical operation signal F1 from an immediately prior operation, and outputs such result at its terminal Q. When only the signal appearing at the J terminal is high signal (and the signal appearing at the K terminal is low), the JK flip-flop 422 outputs a high signal as the output at the Q terminal. When only signal appearing at the K terminal is a high (and the signal appearing at the J terminal is low), the JK flip-flop 422 outputs a low signal as the output at the Q terminal. When the respective signals input to the J and K terminals are both low, the present value of the signal at output terminal Q of the JK flip-flop 422 does not change. The first logical operation signal F1 is provided to the AND gate 423.

The AND gate 423 performs an AND operation of the inverted sensing signal (/ST) and the first logical operation signal F1. The AND gate 423 outputs a second logical operation signal F2.

The SR flip-flop 424 receives the second logical operation signal F2 and the sensing signal ST at its reset (R) and set S terminals, respectively. The SR flip-flop 424 performs a logical operation of the second logical operation signal F2 and the sensing signal ST, and outputs a third logical operation signal F3 at its output terminal Q.

The on-time controller 430 receives the sensing signal ST and the third logical operation signal F3. The on-time controller 430 generates an on-time control signal OTS. For each threshold period TP, the on-time controller 430 senses a rise (or high value) of the sensing signal ST and generates the on-time control signal OTS for turning on the switching transistor 10 at the time of the rise or after some variable delay (e.g., Td). In one embodiment, for each threshold period TP, the on-time control signal OTS output from the on-time controller 430 can be in the form of a short pulse which lags the beginning of the threshold period TP by some variable delay time Td. However, if the variable delay time Td exceeds or goes beyond the respective threshold period TP, the on-time control signal OTS can be in the form of a short pulse output from on-time controller 430 at the falling edge of the third logical operation signal F3. Accordingly, in a resonant waveform of the drain-source voltage Vds of the switching transistor 10, a turn-on point of the switching transistor 10 is determined according to a variable delay time around the valley of the waveform. Although the variable delay time may deviate from (i.e., fall outside of) a threshold period TP, the switching transistor 10 is turned on when the threshold period ends. Thus, energy efficiency of the SMPS can be increased by embodiments of the present invention.

In some embodiments, if it is sensed that the variable delay time Td deviates from (i.e., falls outside of or extends beyond) the respective threshold period TP, the on-time controller 430 shortens or reduces the variable delay time for the next threshold period TP. In some embodiments, the delay time Td can be fixed. In some embodiments, the delay time Td can be increased in increments according to the number of times the switching transistor 10 is turned on over a series of threshold periods TP. However, the present invention is not so limited, and a variable delay time may be irregularly generated, and the variable delay time may be sequentially changed. Further, by counting the number of times that switching transistor 10 is turned on the, switching controller block 400 controls switching transistor 10 with an identical variable delay time. If the number of times switching transistor 10 is turned on reaches a fixed value, the variable delay time can be changed.

The gate driver 440 receives the on-time control signal OTS from the on-time controller 430, and generates and outputs the gate control signal VGS which controls the switching transistor 10. In one embodiment, if the on-time control signal OTS is high, the gate driver 440 sends high gate control signal VGS to turn on the switching transistor 10.

FIG. 6 is a waveform illustrating an exemplary driving method, according to an embodiment of the present invention. In such driving method, switch frequency modulation is performed or implemented by adjusting a delay time for turning on a switching transistor 10 after the initiation of a respective threshold period TP. FIG. 6 includes a number of exemplary waveforms for signals generated in an SMPS which sets or determines the threshold period TP using or in response to a voltage signal VL (or current signal IQ).

FIG. 6(a) is an exemplary waveform of the voltage signal VL. FIG. 6(b) is an exemplary waveform of the sensing signal ST. FIG. 6(c) is an exemplary waveform of the on-time control signal OTS. FIG. 6(d) is an exemplary waveform of the gate control signal VGS. FIG. 6(e) is an exemplary waveform of the third logical operation signal F3.

In FIG. 6, if voltage signal VL has a value of a threshold voltage Vth or less, a current signal IQ may flow in the SMPS when there is a voltage difference between the voltage signal VL and the input terminal IN3.

As illustrated in FIG. 6(a), the voltage signal VL forms a cosine wave based on a resonant reference voltage Vq. Accordingly, as illustrated in FIG. 6(b), the threshold period sensor 410 generates a sensing signal ST which is high during each threshold period TP. As illustrated in FIG. 6(e), for a first threshold period TP (i.e., between times T1 and T2), since a high level of sensing signal ST is input to the set S terminal of the SR flip-flop 424, the third logical operation signal F3 rises to a high level. As illustrated in FIG. 6(c), the on-time controller 430 generates the on-time control signal OTS having a short pulse when the third logical operation signal F3 and sensing signal ST are high. In this case, there is no delay between the beginning of the threshold period TP and the short pulse for on-time control signal OTS. As illustrated in FIG. 6(d), the gate driver 440 generates and outputs a high value for gate control signal VGS in response to the pulse of the on-time control signal OTS. The gate control signal VGS turns on the switching transistor 10. The SR flip-flop 424 maintains the prior output state because the inputs to the set terminal S and the reset terminal R are low even if the sensing signal ST becomes low. Therefore, the third logical operation signal F3 maintains a high level.

When another resonant waveform of the voltage VL is generated as in FIG. 6(a), the sensing signal ST again is high during the respective threshold period TP. Accordingly, the on-time controller 430 generates an on-time control signal OTS having a short pulse at time T4. In this case, the short pulse for the on-time control signal OTS lags or is delayed from the start of the threshold period TP (as defined by the rising of the sensing signal ST) by a variable delay time Td from. The pulse for the on-time control signal OTS is provided to the gate driver 440, which outputs a value of gate control signal VGS (illustrated in FIG. 6(d)) to turn on the switching transistor 10.

The next threshold period TP (during which sensing signal ST is high) begins at time T5. Here, the on-time controller 430 outputs a short pulse for on-time control signal OTS at time T6, which lags or is delayed from the start of the respective threshold period TP by a variable delay time 2Td. The pulse of the on-time control signal OTS is provided to the gate driver 440, which outputs a value of gate control signal VGS (illustrated in FIG. 6(d)) to turn on the switching transistor 10. In this way, for each threshold period TP (corresponding to a respective resonant waveform), the gate control signal VGS for turning on the switching transistor 10 may be provided after some variable delay from the beginning of the threshold period TP. As such, the switching transistor 10 is turned on around a valley according to the gate control signal VGS. For a series of resonant waveforms, the switching controller block 400 increases the delay for each subsequent threshold period TP.

However, if the variable delay exceeds or extends beyond the threshold period TP, the switching transistor 10 is not turned on during the threshold period. Such is the case with the next threshold period TP (shown in FIG. 6) which starts at time T7. Here, the variable delay time has a value 3Td which extends beyond the end of the threshold period TP at time T8. As such, the gate control signal VGS is not high when the sensing signal ST falls to a low value (at the end of the threshold period TP). Accordingly, at time T8, because low values for gate control signal VGS and sensing signal ST are input to the K and J terminals of the JK flip-flop 422, respectively, the value of first logical operation signal F1 output for the immediately prior threshold period TP is maintained. In the immediately prior state, because a high value for sensing signal ST was input to the J terminal, the first logical operation signal F1 is a high value. Because both the input inversion sensing signal (/ST) and the first logical operation signal F1 are high, the AND gate 423 transfers a high level of second logical operation signal F2 to the reset terminal R of the SR flip-flop 424. The SR flip-flop 424 outputs a low value for third logical operation signal F3 and provides the signal to the on-time controller 430. At time T8', on-time controller 430 a falling time of the third logical operation signal F3. The on-time controller 430 generates a short pulse of on-time control signal, transmits the signal to the gate driver 440. The gate driver 440 generates a gate control signal VGS having a high value to turn on the switching transistor 10.

According to an exemplary embodiment of the present invention, the time difference between the time T8 and the time T8' is shorter than a threshold period of a resonant waveform of a drain-source voltage Vds of the switching transistor 10 and can be ignored.

In one embodiment, the SMPS resets the accumulated delay time so that at the next threshold period TP (beginning at time T9), the switching transistor 10 is turned on at the beginning of the threshold period TP. Thereafter, the same operation is repeated. In this way, if the switching transistor 10 is turned on around a valley of a resonant waveform of the drain-source voltage Vds of the switching transistor 10, switching frequency modulation can be internally controlled and generated, thereby decreasing EMI.

In the method of driving the SMPS described above, when the switching transistor 10 is turned on, the variable delay time is uniformly increased. While the turning on of the switching transistor 10 is repeated by a fixed number of times, the variable delay time can be fixed and then the variable delay time can be increased or decreased after the fixed number of times. Moreover, if a fixed time elapses, the variable delay time can be increased or decreased. The fixed number of times or the fixed time may be changed at random.

An SMPS driving method of turning on the switching transistor 10 using the voltage signal VQ according to the embodiment of FIG. 3 is also similar with the above description, but a waveform of a voltage VL is different from the above description. However, the threshold period TP is similar to that of the embodiment using the current signal IQ. As described above, the sensing resistors Rs1, Rs2, and Rs3, a reference current, and a reference voltage can each be variable to adjust the threshold period TP. Accordingly, the threshold period TP can be adjusted using the sensing resistors Rs1, Rs2, and Rs3, a reference current, and a reference voltage around a valley of a resonant waveform of a drain-source voltage of the switching transistor 10. The threshold period TP can be determined by the current signal IQ or the voltage signal VQ.

In general, if a threshold period is widely set, switching frequency modulation range is widened and EMI can be decreased. However, if the switching frequency modulation range is widened, switching loss increases and efficiency of the SMPS can be decreased. Accordingly, an SMPS and a driving method thereof according to exemplary embodiments of the present invention adjust a threshold period TP without an external device by sensing a voltage or a current signal. Thus, embodiments of the present invention can both limit EMI and increase efficiency for an SMPS.

Although the present invention and its advantages have been described in detail, it should be understood that various changes, substitutions, and alterations can be made therein without departing from the spirit and scope of the definition as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A switching mode power supply, comprising:
a rectifier for generating an input DC voltage from an input AC voltage;
a switching transistor coupled to a primary coil of a transformer for converting the input DC voltage and supplying power to a secondary side of the transformer according to an operation of the switching transistor; and
a switching controller that receives a feedback voltage corresponding to an output voltage of the switching mode power supply, a sensing signal corresponding to a current flowing through the switching transistor, and a first signal corresponding to a voltage difference between a first electrode and a second electrode of the switching transistor, the switching controller for controlling the turning on and off of the switching transistor;
wherein the switching controller sets a threshold period whenever the first signal has a value greater than a reference value, thereby setting a plurality of threshold periods during operation of the switching mode power supply;
wherein for each threshold period the switching controller turns on the switching transistor at a point after a variable delay time from a previous point at which the switching transistor was turned on;
wherein the switching controller turns on the switching transistor when a voltage between the first electrode and the second electrode of the switching transistor is equal to the lowest possible value if the input DC voltage is less than or equal to a modulation reference value.

2. The switching mode power supply of claim 1, wherein the modulation reference value is the highest input DC voltage when frequency modulation of the switching transistor is generated by a ripple of the input DC voltage, such frequency modulation of the switching transistor causing the switching mode power supply to meet an EMI regulation.

3. The switching mode power supply of claim 1, wherein the variable delay time comprises a first delay time and a second delay time, wherein the second delay time can have the same or different value as the first delay time.

4. The switching mode power supply of claim 3, wherein the switching controller counts the number of times of turning on of the switching transistor and changes the variable delay time according to the count.

5. The switching mode power supply of claim 3, wherein the switching controller changes the variable delay time when a predetermined time passes.

6. The switching mode power supply of claim 3, wherein the switching controller turns on the switching transistor at an end of the threshold period if the variable delay time is longer than the threshold period.

7. The switching mode power supply of claim 6, wherein for a first threshold period the switching controller turns on the switching transistor after the first delay time from the start of the first threshold period and for a second threshold period the switching controller turns on the switching transistor after the second delay time from the start of the second threshold period.

8. The switching mode power supply of claim 7, wherein the first signal corresponding to a voltage difference between a first electrode and a second electrode of the switching transistor is a current signal, wherein the switching controller sets each threshold period by comparing the first signal against a reference current value.

9. The switching mode power supply of claim 8, wherein the switching controller comprises:
a threshold period sensor for generating a sensing signal, the sensing signal having a pulse of a first level during each threshold period;
a period determining unit for determining whether the variable delay time for each threshold period extends beyond the end of such threshold period;
an on-time controller for generating an on-time control signal for turning on the switching after the lapse of the variable delay time from a start of each threshold period; and
a gate driver for generating a gate control signal that turns on the switching transistor according to the on-time control signal.

10. The switching mode power supply of claim 9, wherein the period determining unit comprises:
a first logical operation unit for receiving the gate control signal and the sensing signal at a first stage and a second stage, respectively, and for generating a first logical operation signal in response,
wherein if the sensing signal is of a first level, the first logical operation signal is of a second level,
wherein if both of the gate control signal and the sensing signal are of a third level, the first logical operation signal is sustained at a level for an immediately prior logic operation;
a second logical operation unit for receiving an inverted sensing signal and the first logical operation signal, and for generating a second logical operation signal by performing an AND operation of the inverted sensing signal and the first logical operation signal; and
a third logical operation unit for receiving the sensing signal and the second logical operation signal at a third stage and a fourth stage, respectively, and for generating a third logical operation signal in response,
wherein if the second logical operation signal is of a fourth level, the third logical operation signal is of a fifth level.

11. The switching mode power supply of claim 10, wherein the first level, the second level, and the fourth level are a high level, and the third level and the fifth level are a low level.

12. The switching mode power supply of claim 1, wherein the switching controller and the switching transistor are provided in a single semiconductor package.

13. The switching mode power supply of claim 1, wherein the switching controller and the switching transistor are provided in separate semiconductor packages.

14. A switching mode power supply comprising: a rectifier for generating an input DC voltage from an input AC voltage; a switching transistor that is coupled to a primary coil of a transformer for converting the input DC voltage and supplying power to a secondary side of the transformer according to an operation of the switching transistor; and a switching controller that receives a feedback voltage corresponding to an output voltage of the switching mode power supply, a sensing signal corresponding to a current flowing through the switching transistor, and a first signal corresponding to a voltage difference between a first electrode and a second electrode of the switching transistor, the switching controller for controlling the turning on and off of the switching transistor;
wherein the switching controller sets a threshold period whenever the first signal has a value greater than a reference value, thereby setting a plurality of threshold periods during operation of the switching mode power supply;

wherein for each of said plurality of threshold periods: if a variable delay time does not extend beyond the threshold period, the switching controller turns on the switching transistor after a lapse of the variable delay time; if the variable time does extend beyond the threshold period, the switching controller turns on the switching transistor after a lapse of the threshold period.

15. The switching mode power supply of claim 14, wherein over a series of threshold periods, the variable delay time is increased for each subsequent threshold period.

16. The switching mode power supply of claim 14, wherein the switching controller turns on the switching transistor when a voltage between the first electrode and the second electrode of the switching transistor is equal to the lowest possible value if the input DC voltage is less than or equal to a modulation reference value.

17. The switching mode power supply of claim 16, wherein the modulation reference value is the highest input DC voltage when frequency modulation of the switching transistor is generated by a ripple of the input DC voltage, such frequency modulation of the switching transistor causing the switching mode power supply to meet an EMI regulation.

18. The switching mode power supply of claim 14, wherein the variable delay time comprises a first delay time and a second delay time, wherein the second delay time can have the same or different value as the first delay time.

19. The switching mode power supply of claim 18, wherein the switching controller counts the number of times of turning on of the switching transistor and changes the variable delay time according to the count.

20. The switching mode power supply of claim 18, wherein the switching controller changes the variable delay time when a predetermined time passes.

21. The switching mode power supply of claim 18, wherein the switching controller turns on the switching transistor at an end of the threshold period if the variable delay time is longer than the threshold period.

22. The switching mode power supply of claim 21, wherein for a first threshold period the switching controller turns on the switching transistor after the first delay time from the start of the first threshold period and for a second threshold period the switching controller turns on the switching transistor after the second delay time from the start of the second threshold period.

23. The switching mode power supply of claim 22, wherein the switching controller comprises:
a threshold period sensor for generating a sensing signal, the sensing signal having a pulse of a first level during each threshold period;
a period determining unit for determining whether the variable delay time for each threshold period extends beyond the end of such threshold period;
an on-time controller for generating an on-time control signal for turning on the switching after the lapse of the variable delay time from a start of each threshold period; and
a gate driver for generating a gate control signal that turns on the switching transistor according to the on-time control signal.

24. The switching mode power supply of claim 23, wherein the period determining unit comprises:
a first logical operation unit for receiving the gate control signal and the sensing signal at a first stage and a second stage, respectively, and for generating a first logical operation signal in response,
wherein if the sensing signal is of a first level, the first logical operation signal is of a second level,
wherein if both of the gate control signal and the sensing signal are of a third level, the first logical operation signal is sustained at a level for an immediately prior logic operation;
a second logical operation unit for receiving an inverted sensing signal and the first logical operation signal, and for generating a second logical operation signal by performing an AND operation of the inverted sensing signal and the first logical operation signal; and
a third logical operation unit for receiving the sensing signal and the second logical operation signal at a third stage and a fourth stage, respectively, and for generating a third logical operation signal in response,
wherein if the second logical operation signal is of a fourth level, the third logical operation signal is of a fifth level.

25. The switching mode power supply of claim 24, wherein the first level, the second level, and the fourth level are a high level, and the third level and the fifth level are a low level.

26. The switching mode power supply of claim 14, wherein the switching controller and the switching transistor are provided in a single semiconductor package.

27. The switching mode power supply of claim 14, wherein the switching controller and the switching transistor are provided in separate semiconductor packages.

28. A method for driving a switching mode power supply that generates an input DC voltage by rectifying an input AC voltage, and generates an output DC voltage by converting the input DC voltage according to the turning on and off of a switching transistor, the method comprising:
generating a first signal corresponding to a voltage between the first electrode and the second electrode of the switching transistor after the switching transistor is turned off;
sensing a threshold period using a current signal corresponding to the first signal;
turning on the switching transistor at a point after a variable delay from a previous point at which the switching transistor was turned on;
changing the variable delay period; and
turning on the switching transistor when a voltage between the first electrode and the second electrode of the switching transistor equal to the lowest possible value if the input DC voltage is less than or equal to a modulation reference value.

29. The method of claim 28, wherein the modulation reference value is the highest input DC voltage when frequency modulation of the switching transistor is generated by a ripple of the input DC voltage, such frequency modulation of the switching transistor causing the switching mode power supply to meet an EMI regulation.

30. The method of claim 28, wherein the switching transistor is turned on at an end of the threshold period if the variable delay time is longer than the threshold period.

31. The method of claim 30, further comprising:
turning on the switching transistor when a voltage between the first electrode and the second electrode of the switching transistor equal to the lowest possible value if the input DC voltage is less than or equal to a modulation reference value.

32. The method of claim 31, wherein the modulation reference value is the highest input DC voltage when frequency modulation of the switching transistor is generated by a ripple of the input DC voltage, such frequency modulation of the switching transistor causing the switching mode power supply to meet an EMI regulation.

33. The method of claim 30, further comprising:
counting the number of times that the switching transistor is turned on; and
changing the variable delay time changed according to the count.

34. The method of claim 33, further comprising:
turning on the switching transistor when a voltage between the first electrode and the second electrode of the switching transistor equal to the lowest possible value if the input DC voltage is less than or equal to a modulation reference value.

35. The method of claim 34, wherein the modulation reference value is the highest input DC voltage when frequency modulation of the switching transistor is generated by a ripple of the input DC voltage, such frequency modulation of the switching transistor causing the switching mode power supply to meet an EMI regulation.

36. The method of claim 30, wherein the variable delay time is changed if a predetermined time elapses.

37. The method of claim 36, further comprising:
turning on the switching transistor when a voltage between the first electrode and the second electrode of the switching transistor equal to the lowest possible value if the input DC voltage is less than or equal to a modulation reference value.

38. The method of claim 37, wherein the modulation reference value is the highest input DC voltage when frequency modulation of the switching transistor is generated by a ripple of the input DC voltage, such frequency modulation of the switching transistor causing the switching mode power supply to meet an EMI regulation.

39. A method for driving a switching mode power supply that generates an input DC voltage by rectifying an input AC voltage, and generates an output DC voltage by converting the input DC voltage according to turning on and off of a switching transistor, the method comprising:
generating a first signal corresponding to a voltage between a first electrode and a second electrode of the switching transistor after the switching transistor is turned off;
setting a threshold period when a voltage of the first signal is higher than a reference voltage;
if a variable delay time does not extend beyond the threshold period, turning on the switching transistor after a lapse of the variable delay period;
if the variable delay time does extend beyond the threshold period, turning on the switching transistor after a lapse of the threshold period; and changing the variable delay period.

40. The method of claim 39, further comprising:
turning on the switching transistor when a voltage between the first electrode and the second electrode of the switching transistor is equal to the lowest possible value if the input DC voltage is less than or equal to a modulation reference value.

41. The method of claim 40, wherein the modulation reference value is the highest input DC voltage when frequency modulation of the switching transistor is generated by a ripple of the input DC voltage, such frequency modulation of the switching transistor causing the switching mode power supply to meet an EMI regulation.

42. The method of claim 39, wherein the switching transistor is turned on at an end of the threshold period if the variable delay time is longer than the threshold period.

43. The method of claim 42, further comprising:
turning on the switching transistor when a voltage between the first electrode and the second electrode of the switching transistor is equal to the lowest possible value if the input DC voltage is less than or equal to a modulation reference value.

44. The method of claim 43, wherein the modulation reference value is the highest input DC voltage when frequency modulation of the switching transistor is generated by a ripple of the input DC voltage, such frequency modulation of the switching transistor causing the switching mode power supply to meet an EMI regulation.

45. The method of claim 42, further comprising:
counting the number of times that the switching transistor is turned on; and
changing the variable delay time changed according to the count.

46. The method of claim 45, further comprising:
turning on the switching transistor when a voltage between the first electrode and the second electrode of the switching transistor is equal to the lowest possible value if the input DC voltage is less than or equal to a modulation reference value.

47. The method of claim 46, wherein the modulation reference value is the highest input DC voltage when frequency modulation of the switching transistor is generated by a ripple of the input DC voltage, such frequency modulation of the switching transistor causing the switching mode power supply to meet an EMI regulation.

48. The method of claim 42, wherein in the variable delay time is changed if a predetermined time elapses.

49. The method of claim 48, further comprising:
turning on the switching transistor when a voltage between the first electrode and the second electrode of the switching transistor is equal to the lowest possible value if the input DC voltage is less than or equal to a modulation reference value.

50. The method of claim 49, wherein the modulation reference value is the highest input DC voltage when frequency modulation of the switching transistor is generated by a ripple of the input DC voltage, such frequency modulation of the switching transistor causing the switching mode power supply to meet an EMI regulation.

* * * * *